United States Patent [19]
Knott

[11] Patent Number: 5,216,732
[45] Date of Patent: Jun. 1, 1993

[54] OPTICAL FIBER GUIDE CONNECTION

[75] Inventor: Michael P. Knott, Urmston, England

[73] Assignee: Bicc plc, England

[21] Appl. No.: 848,034

[22] Filed: Mar. 9, 1992

[30] Foreign Application Priority Data

Mar. 22, 1991 [GB] United Kingdom ............... 9106183

[51] Int. Cl.⁵ .............................................. G02B 6/38
[52] U.S. Cl. .................................... 385/59; 385/56; 385/58; 385/64; 385/71
[58] Field of Search .................... 385/53, 54, 55, 56, 385/58, 59, 64, 71, 82, 88, 89, 139

[56] References Cited

U.S. PATENT DOCUMENTS

| | | | |
|---|---|---|---|
| 4,383,729 | 5/1983 | Suzuki et al. | 385/89 |
| 4,445,750 | 5/1984 | Grois et al. | 385/87 |
| 4,597,631 | 7/1986 | Flores | 385/59 |
| 4,840,451 | 6/1989 | Sampson et al. | 385/88 |
| 4,993,803 | 2/1991 | Saverison et al. | 385/88 |
| 5,069,524 | 12/1991 | Watanabe et al. | 385/59 |
| 5,097,523 | 3/1992 | Marie | 385/59 |
| 5,104,243 | 4/1992 | Harding | 385/89 |
| 5,119,455 | 6/1992 | Jennings et al. | 385/59 |
| 5,125,056 | 6/1992 | Hughes et al. | 385/59 |
| 5,133,032 | 7/1992 | Salter et al. | 385/59 |

Primary Examiner—Brian Healy
Attorney, Agent, or Firm—Anthony J. Casella; Gerald E. Hespos

[57] ABSTRACT

Optical connecting means for effecting disconnectable optical connections between multiplicities of optical fibres comprises a two-part mechanical connector and a plurality of two-part optical fibre connectors mounted in the body parts, of the mechanical connector. One body part of each optical fibre connector is slidably mounted in and with respect to the body part of the mechanical connector with their axes parallel to one another and is urged by a spring housed in the body part in a rectilinear direction towards the mating end of the body part. One body part of each optical fibre connector is fixedly secured in and with respect to the body part of the mechanical connector with their axes parallel to one another. Preferably, the body parts of the optical fibre connectors in each body part of the mechanical connector 1 are mounted one above another.

16 Claims, 1 Drawing Sheet

OPTICAL FIBER GUIDE CONNECTION

BACKGROUND OF THE INVENTION

This invention relates to the effecting of disconnectable optical connections between multiplicities of optical guides.

The invention is especially, but not exclusively, concerned with the effecting of disconnectable optical connections between multiplicities of optical guides which are components of two or more flexible optical cables or other flexible optical elements which are to be optically connected but it is to be clearly understood that, in some circumstances, the invention may be applicable to effecting optical connections between a multiplicity of optical guides carried by a backplane.

It is an object of the present invention to provide improved means for effecting disconnectable optical connections between multiplicities of optical guides, which improved optical connection means does not occupy an undesirably large space.

SUMMARY OF THE INVENTION

According to the invention, the improved optical connecting means comprises a mechanical connector comprising two separately formed body parts adapted to make a disconnectable plug and socket connection the one with the other and a plurality of optical fibre connectors each comprising at least two separately formed mating body parts, each of which mating body parts has at least one substantially flat end face with which end faces of a plurality of optical fibres secured in said body part are substantially co-planar, one body part of each of the plurality of optical fibre connectors being slidably mounted in and with respect to one body part of the mechanical connector with its axis substantially parallel to the axis of said body part of the mechanical connector and with each of its optical fibres adapted to be optically connected to or integral with one of a multiplicity of optical guides and being urged by resilient means housed in said body part of the mechanical connector in a rectilinear direction substantially parallel to said axes towards the mating end of said body part of the mechanical connector, and the other or another body part of each optical fibre connector being fixedly secured in and with respect to the other body part of the mechanical connector with its axis substantially parallel to the axis of the other body part of the mechanical connector and with each of its optical fibres adapted to be optically connected to or integral with one of another multiplicity of optical guides or being slidably mounted in and with respect to said other body part of the mechanical connector with its axis substantially parallel to the axis of said other body part of the mechanical connector and with each of its optical fibres adapted to be optically connected to or integral with one of said other multiplicity of optical guides and being urged by resilient means housed in said other body part of the mechanical connector in a rectilinear direction substantially parallel to said axes towards the mating end of said other body part of the mechanical connector.

Each optical fibre connector preferably is a two-part plug and socket optical fibre connector.

Preferably, the axes of the plurality of optical fibres of each optical fibre connector body part over at least parts of the lengths of the fibres extending from the or each mating end face of said optical fibre connector body part and, preferably also, the central longitudinal axis of said body part, lie in a substantially common plane. In this case, preferably the plurality of optical fibre connector body parts accommodated in each body part of the mechanical connector are disposed side-by-side with said substantially common planes of the axes of said parts of the lengths of their optical fibres lying substantially parallel to one another. Preferably, also, each of the plurality of optical fibre connector body parts accommodated in each body part of the mechanical connector has a single flat mating end face and the flat mating end faces of said plurality of optical fibre connector body parts lie in a common plane which is substantially normal to the common plane in which lie the axes of said parts of the lengths of the optical fibres and the longitudinal axis of each optical fibre connector body part.

The plug and socket connection between the two body parts of each optical fibre connector may take any convenient form but, preferably, one body part of each optical fibre connector has a pair of substantially rigid pins protruding from its mating end face substantially parallel to the central longitudinal axis of the body part and disposed on transversely opposite sides of the optical fibres secured in the body part, the axes of the pins lying in the same substantially common plane as the axes of said parts of the lengths of the optical fibres, and the other body part of each optical fibre connector has a pair of holes extending substantially parallel to the central longitudinal axis of said other body part and disposed on transversely opposite sides of the optical fibres secured in said other body part, the axes of said holes lying in the same substantially common plane as the axes of said parts of the lengths of the optical fibres. In some circumstances, as has been previously described, one body part of each optical fibre connector may be fixedly secured in and with respect to one body part of the mechanical connector and, in this case, preferably the fixed body part of each optical fibre connector has a pair of substantially rigid pins protruding from its mating end face and serving to effect a plug and socket connection with holes in the other body part of said optical fibre connector.

The end face of one or each body part of each of the plurality of optical fibre connectors preferably is set back from the mating end face of the body part of the mechanical connector in which it is mounted to reduce risk of damage to the end face of each optical fibre thereof.

The plug and socket connection between the body parts of the mechanical connector may also take any convenient form. In one preferred embodiment, the plug and socket connection is effected by two substantially rigid pins protruding from the mating end of one body part of the mechanical connector and transversely spaced on opposite sides of and in substantially the same plane as the central longitudinal axes of said body part and of the optical fibre connector body parts accommodated therein; in this case, the other body part of the mechanical connector will have in its mating end face two correspondingly transversely spaced holes extending substantially parallel to and lying in the same plane as the central longitudinal axes of said other body part and of the optical fibre connector body parts accommodated therein.

Where, as is preferred, the plurality of optical fibre connector body parts accommodated in each body part of the mechanical connector are disposed side-by-side with the common planes containing the axes of their optical fibres lying substantially parallel to one another, preferably the rigid pins, or associated holes, constituting the plug and socket connection between the body parts of the mechanical connector are transversely spaced on opposite sides of the plurality of optical fibre connector body parts with the axes of the pins, or associated holes, and the central longitudinal axis of the body part of the mechanical connector lying in a substantially common plane which is substantially normal to the common planes containing the axes of said parts of the lengths of the optical fibres of the optical fibre connector body parts.

Preferably, to assist in effecting initial interengagement between the pins and associated holes of the body parts of the optical fibre connectors, one body part of the mechanical connector effectively constitutes a socket into which the other body part, constituting a plug, will engage when a plug and socket connection between the two body parts is effected and, in this case, one of the body parts of the mechanical connector may have at least one keyway within which a portion of the other body part of the mechanical connector will slidably engage. Preferably, also, the body parts of the mechanical connector are adapted to effect a releasable snap-fit the one with the other and, for this purpose, preferably one of the two body parts of the mechanical connector has a pair of oppositely disposed resilient or spring loaded latches adapted to effect releasable engagement with the other body part of the mechanical connector.

Where the improved optical connecting means is to be used to effect disconnectable optical connections between multiplicities of optical guides which are components of two or more flexible optical cables or other flexible optical elements, the improved optical connecting means may be disposed in-line between the cables or other elements to be optically connected or one or each of the body parts of the mechanical connector of the improved optical connecting means may be detachably mounted on a panel or other support. For this latter purpose, one or each body part of the mechanical connector of the improved optical connecting means may have integral with or secured to the body part one or more than one apertured lug or other means for use in detachably mounting the body part on a panel or other support.

BRIEF DESCRIPTION OF THE DRAWINGS

The invention is further illustrated by a description, by way of example, of one preferred two-part means for effecting disconnectable optical connections between multiplicities of optical guides, with reference to the accompanying drawing, in which.

DETAILED DESCRIPTION OF THE PREFERRED EMBODIMENT

Figure 1:
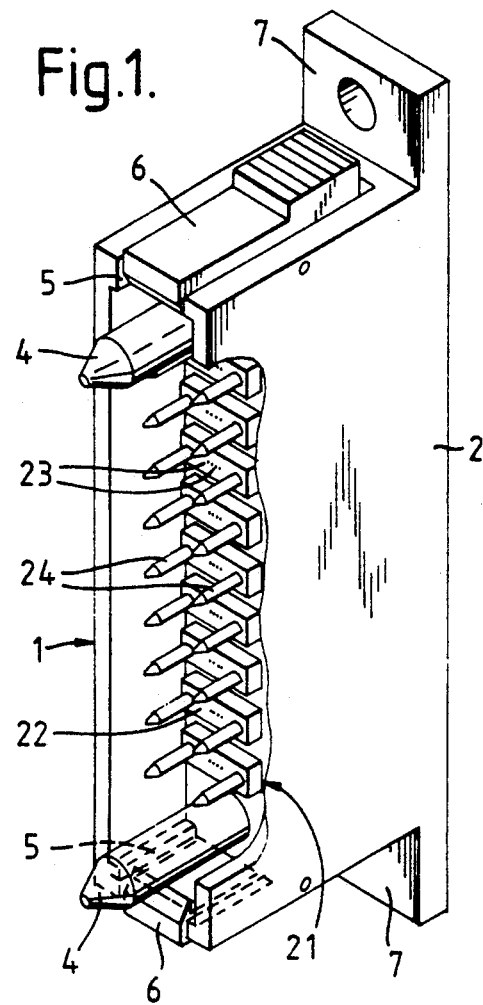
FIG. 1 is an isometric view of the male part of said preferred two-part optical connecting means.
Figure 2:
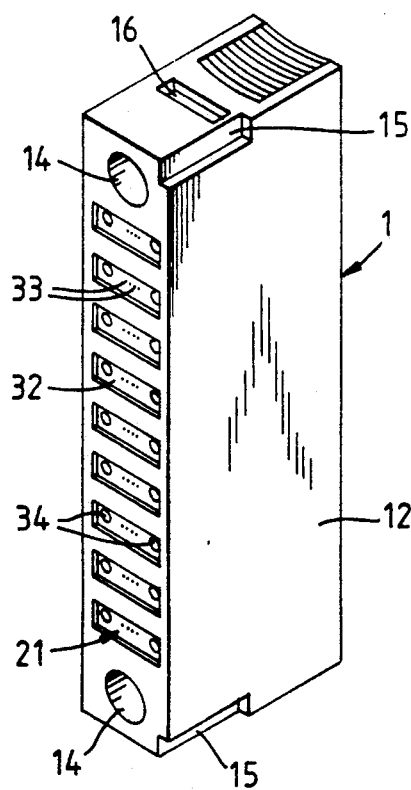
FIG. 2 is an isometric view of the female part of said preferred two-part optical connecting means.

Referring to the drawing, the preferred two-part optical connecting means comprises a mechanical connector 1 comprising two separately formed body parts 2, 12 adapted to make a disconnectable plug and socket connection the one with the other and a plurality of optical fibre connectors 21 each comprising two separately formed mating body parts 22, 32, the body parts 22 of the optical fibre connectors being mounted in the body part 2 of the mechanical connector and the body parts 32 of the optical fibre connectors being mounted in the body part 12 of the mechanical connector.

Each of the mating body parts 22, 32 of each optical fibre connector 21 is of rectangular transverse cross-section and has an exposed flat mating end face with which end faces of a plurality of optical fibres 23, 33 secured in the body part are co-planar, the axes of the optical fibres over parts of lengths of the fibres extending from the mating end face and the central longitudinal axis of the body part lying in a common plane which is parallel to the major side faces of the rectangular shaped body part. The ends of the optical fibres 23, 33 remote from the end faces of the optical fibres co-planar with the mating end faces of the body parts 22, 23 are optically connected to optical fibres of a plurality of flexible optical cables (not shown). The body parts 22 of the optical fibre connectors 21 are fixedly secured in and with respect to the body part 2 of the mechanical connector 1 with the common planes of the axes of said parts of the lengths of the optical fibres 23 lying parallel to one another and with the longitudinal axes of the body parts 22 lying parallel to the longitudinal axis of the body part 2 of the mechanical connector. The body parts 32 of the optical fibre connectors 21 are slidably mounted side-by-side in and with respect to the body part 12 of the mechanical connector 1 with the common planes of the axes of said parts of the lengths of the optical fibres 33 lying parallel to one another and with the longitudinal axes of the body parts 32 lying parallel to the longitudinal axis of the body part 12 of the mechanical connector and each body part 32 is urged by spring means (not shown) in a direction towards the mating end face of the body part 12 of the mechanical connector. The mating end faces of the body parts 32 of the optical fibre connectors 21 lie in a common plane which is normal to the common planes in which lie the axes of said parts of the lengths of the optical fibres 33 and the longitudinal axis of each body part and which is set back from the mating end face of the body part 12 of the mechanical connector 1 to reduce risk of damage to the end face of any optical fibre; likewise, the mating end faces of the body parts 22 of the optical fibre connectors lie in a common plane which is normal to the common planes in which lie the axes of said parts of the lengths of the optical fibres 23 and the longitudinal axis of each body part and which is set back from the mating end face of the body part 2 of the mechanical connector for the same purpose.

The body part 22 of each optical fibre connector 21 has a pair of rigid pins 24 protruding from its mating end face parallel to the central longitudinal axis of the body part and disposed on transversely opposite sides of the optical fibres 23, the axes of the pins lying in the same common plane as the axes of said parts of the lengths of the optical fibres; the body part 32 of each optical fibre connector has a pair of holes 34 extending parallel to the central longitudinal axis of the body part and disposed on transversely opposite sides of the optical fibres 33, the axes of the holes lying in the same common plane as the axes of said parts of the lengths of the optical fibres.

The body part 2 of the mechanical connector 1 has two rigid pins 4 protruding from the mating end of the body part and transversely spaced on opposite sides of and in the same plane as the central longitudinal axes of the body part 2 and of the body parts 22 of the optical fibre connectors 21; the body part 12 of the mechanical connector has in its mating end face two correspondingly transversely spaced holes 14 extending parallel to and lying in the same plane as the central longitudinal axes of the body part 12 and of the body parts 32 of the optical fibre connectors.

To assist in effecting initial inter-engagement between the pins 24 and associated holes 34 of the body parts 22 and 32 of the optical fibre connectors 21, the side and end walls of the body part 2 of the mechanical connector 1 protrude beyond the ends of the pins 24 of the body parts 22 of the optical fibre connectors to such an extent as to form a socket into which the body part 12 of the mechanical connector, constituting in effect a plug, will engage when the pins 4 of the body part 2 effect plug and socket connections in the holes 14 of the body part 12. At each end of the body part 2 of the mechanical connector 1, shoulders 5 are formed which will slidably engage in keyways 15 at opposite ends of the body part 12. The body part 2 of the mechanical connector 1 also has a pair of oppositely disposed resilient latches 6 which are adapted to effect releasable engagement in recesses 16 in opposite end faces of the body part 12. The body part 2 of the mechanical connector 1 has a pair of oppositely disposed apertured lugs 7 remote from the mating end of the body part for use in detachably mounting the body part on a panel or other support.

What I claim as my invention is:

1. Means for effecting disconnectable optical connections between multiplicities of optical guides, which optical connecting means comprises a mechanical connector comprising two separately formed body parts adapted to make a disconnectable plug and socket connection the one with the other and a plurality of optical fibre connectors each comprising at least two separately formed mating body parts, each of which mating body parts has at least one substantially flat end face with which end faces of a plurality of optical fibres secured in said body part are substantially co-planar, at least one body part of each of the plurality of optical fibre connectors being slidably mounted in and with respect to one body part of the mechanical connector with its axis substantially parallel to the axis of said body part of the mechanical connector and with each of its optical fibres adapted to be optically connected to one of a multiplicity of optical guides and being urged by resilient means housed in said body part of the mechanical connector in a rectilinear direction substantially parallel to said axes towards the mating end of said body part of the mechanical connector.

2. Means for effecting disconnectable optical connections between multiplicities of optical guides, which optical connecting means comprises a mechanical connector comprising two separately formed body parts adapted to make a disconnectable plug and socket connection the one with the other and a plurality of optical fibre connectors each comprising at least two separately formed mating body parts, each of which mating body parts has at least one substantially flat end face with which end faces of a plurality of optical fibres secured in said body part are substantially co-planar, one body part of each of the plurality of optical fibre connectors being slidably mounted in and with respect to one body part of the mechanical connector with its axis substantially parallel to the axis of said body part of the mechanical connector and with each of its optical fibres adapted to be optically connected to one of a multiplicity of optical guides and being urged by resilient means housed in said body part of the mechanical connector in a rectilinear direction substantially parallel to said axes towards the mating end of said body part of the mechanical connector, and another body part of each optical fibre connector being fixedly secured in and with respect to the other body part of the mechanical connector with its axis substantially parallel to the axis of the other body part of the mechanical connector and with each of its optical fibres adapted to be optically connected to one of another multiplicity of optical guides.

3. Optical connecting means as claimed in claim 2, wherein each optical fibre connector is a two-part plug and socket optical fibre connector.

4. Optical connecting means as claimed in claim 2, wherein the axes of the plurality of optical fibres of each optical fibre connector body part over at least parts of the lengths of the fibres extending from the mating end face of said optical fibre connector body part lie in a substantially common plane.

5. Optical connecting means as claimed in claim 3, wherein the axes of the plurality of optical fibres of each optical fibre connector body part over at least parts of the lengths of the fibres extending from the mating end face of said optical fibre connector body part and the central longitudinal axis of said body part lie in a substantially common plane.

6. Optical connecting means as claimed in claim 5, wherein the plurality of optical fibre connector body parts accommodated in each body part of the mechanical connector are disposed side-by-side with said substantially common planes of the axes of said parts of the lengths of their optical fibres lying substantially parallel to one another.

7. Optical connecting means as claimed in claim 6, wherein each of the plurality of optical fibre connector body parts accommodated in each body part of the mechanical connector has a single flat mating end face and the flat mating end faces of said plurality of optical fibre connector body parts lie in a common plane which is substantially normal to the common planes in which lie the axes of said parts of the lengths of the optical fibres and longitudinal axis of each optical fibre connector body part.

8. Optical connecting means as claimed in claim 5, wherein one body part of each optical fibre connector has a pair of substantially rigid pins protruding from its mating end face substantially parallel to the central longitudinal axis of the body part and disposed on transversely opposite sides of the optical fibres secured in the body part, the axes of the pins lying in the same substantially common plane as the axes of said parts of the lengths of the optical fibres, and the other body part of each optical fibre connector has a pair of holes extending substantially parallel to the central longitudinal axis of said other body part and disposed on transversely opposite sides of the optical fibres secured in said other body part, the axes of said holes lying in the same substantially common plane as the axes of said parts of the lengths of the optical fibres.

9. Optical connecting means as claimed in claim 8, wherein the fixed body part of each optical fibre connector has a pair of substantially rigid pins protruding from its mating end face and serving to effect a plug and socket connection with holes in the other body part of said optical fibre connector.

10. Optical connecting means as claimed in claim 5, wherein the end face of at least one body part of each of the plurality of optical fibre connectors is set back from the mating end face of the body part of the mechanical connector in which it is mounted.

11. Optical connecting means as claimed in claim 5, wherein the plug and socket connection between the body parts of the mechanical connector is effected by two substantially rigid pins protruding from the mating end of one body part of the mechanical connector and transversely spaced on opposite sides of and in substantially the same plane as the central longitudinal axes of said body part and of the optical fibre connector body parts accommodated therein, and two correspondingly transversely spaced holes in the mating end face of the other body part of the mechanical connector, which holes extend substantially parallel to and lie in the same plane as the central longitudinal axes of said other body part and of the optical fibre connector body parts accommodated therein.

12. Optical connecting means as claimed in claim 11, wherein the rigid pins, and associated holes, constituting the plug and socket connection between the body parts of the mechanical connector are transversely spaced on opposite sides of the plurality of optical fibre connector body parts with the axes of the pins, and associated holes, and the central longitudinal axis of the body part of the mechanical connector lying in a substantially common plane which is substantially normal to the common planes containing the axes of said parts of the lengths of the optical fibres of the optical fibre connector body parts.

13. Optical connecting means as claimed in claim 1, wherein one body part of the mechanical connector effectively constitutes a socket into which the other body part, constituting a plug, will engage when a plug and socket connection between the two body parts is effected.

14. Optical connecting means as claimed in claim 13, wherein one of the body parts of the mechanical connector has at least one keyway within which a portion of the other body part of the mechanical connector will slidably engage.

15. Optical connecting means as claimed in claim 13, wherein the body parts of the mechanical connector are adapted to effect a releasable snap-fit the one with the other.

16. Optical connecting means as claimed in claim 1, wherein at least one body part of the mechanical connector has at least one apertured lug for use in detachably mounting the body part on a support.

* * * * *